United States Patent
Louis et al.

(10) Patent No.: US 6,246,928 B1
(45) Date of Patent: Jun. 12, 2001

(54) ELECTRICAL INTERRUPTION DEVICE COMPRISING A COMMUNICATION MODULE

(75) Inventors: Patrice Louis; Jocelyn Lemoine, both of Grenoble (FR)

(73) Assignee: Schneider Electric SA (FR)

( * ) Notice: Subject to any disclaimer, the term of this patent is extended or adjusted under 35 U.S.C. 154(b) by 0 days.

(21) Appl. No.: 09/183,946

(22) Filed: Nov. 2, 1998

(30) Foreign Application Priority Data

Dec. 9, 1997 (FR) .................................................. 97 15811

(51) Int. Cl.[7] .................................................. G05D 11/00
(52) U.S. Cl. .............................. 700/292; 700/286; 361/54
(58) Field of Search ........................... 700/286, 292–294; 702/67; 345/352; 361/54, 56, 64, 86

(56) References Cited

U.S. PATENT DOCUMENTS

| 5,440,088 | 8/1995 | Coudert et al. ...................... 200/303 |
| 5,691,619 | * 11/1997 | Vingsbo ................................. 361/86 |
| 5,786,641 | * 7/1998 | Nakanishi et al. .................... 700/286 |
| 5,859,596 | * 1/1999 | McRae ............................. 340/870.02 |
| 5,880,954 | * 3/1999 | Thomson et al. ....................... 700/80 |
| 5,973,898 | * 10/1999 | Merchant et al. ...................... 361/56 |
| 6,005,757 | * 12/1999 | Shvach et al. .......................... 361/64 |

FOREIGN PATENT DOCUMENTS

| 195 46 268A1 | 6/1997 | (DE) . |
| 0 571 898 A1 | 12/1993 | (EP) . |
| 0 792 096 A1 | 8/1997 | (EP) . |
| WO 93/12566 | 6/1993 | (WO) . |

* cited by examiner

Primary Examiner—William Grant
Assistant Examiner—Kidest Bahta
(74) Attorney, Agent, or Firm—Parkhurst & Wendel, L.L.P

(57) ABSTRACT

The interruption device, circuit breaker or contactor, comprises a communication module arranged in one of the locations designed for auxiliary contacts. The module is connected to the auxiliary contacts and to a communication bus to enable transmission of the states of the device to a supervision device, by means of the bus. The module can also act as interface between the bus and opening an closing control relays of the device, so as to enable remote control thereof by means of the bus.

7 Claims, 3 Drawing Sheets

ELECTRICAL INTERRUPTION DEVICE COMPRISING A COMMUNICATION MODULE

BACKGROUND OF THE INVENTION

The invention relates to an electrical interruption device comprising a plurality of locations for auxiliary contacts whose state is representative of the state of the device, at least one auxiliary contact located in one of said locations and a communication module designed to be connected to a communication bus.

Electrical interruption devices, and more particularly circuit breakers and/or contactors, must be able to communicate with supervision and/or control devices. FIGS. 1 to 3 illustrate the various types of communication provided in known circuit breakers.

The circuit breaker 1, according to FIG. 1, comprises a trip device 2 of electronic type. The trip device 2 comprises a communication output enabling data transmission to an external indication module 4 via a unidirectional serial link 3. As an example, the trip device 2 can transmit data representative of the trip device settings, of the measured current values, of overshooting of certain thresholds, or of the cause of tripping. The module 4 can, for its part, be connected to a communication bus 5. A trip device of this kind is, for example, marketed by the Applicant under the trademark STR53UE, in association with a circuit breaker of COMPACT NS mark, to communicate with a module of DIALPACT mark able to communicate with a supervisor via a BatiBUS or JBUS type bus.

The circuit breaker 1 according to FIG. 2 also comprises a trip device 2 of electronic type. This trip device is able to transmit information to a bus 6 able to be connected directly to a supervision unit. It can in addition be equipped with an electrical control 7 connected to a bus 5 by means of an external remote control module 8. A trip device of this kind is, for example, marketed by the Applicant under the trademark STR68, in association with a circuit breaker of MASTERPACT trademark. It transmits information representative of the state of the circuit breaker or of the state of the power supply network to a supervisor by means of a JBUS or PPNET type bus.

The circuit breaker 1 of FIG. 3 is equipped with a thermomagnetic type trip device 2. A trip device of this kind cannot communicate directly with an external bus. However, the circuit breaker 1 classically comprises a certain number of auxiliary contacts 9 actuated by the circuit breaker mechanism and whose position, linked to the position of the main contacts of the circuit breaker, is representative of the state of the circuit breaker. Conventionally, an auxiliary contact (O/F) indicates the open/closed position of the circuit breaker poles, another auxiliary contact (SD) indicates that the circuit breaker is in the tripped state, whereas a third contact (SDE) supplies an electrical fault signal when the circuit breaker has been tripped by an electrical fault (overload, short-circuit, differential fault) detected by the circuit breaker. The auxiliary contacts can be connected, wire to wire, to an external indication module 4, of DIALPACT type for example, which can itself be connected to a supervisor by a bus 5. The circuit breaker can, as in FIG. 2, be remote controlled, by means of the bus 5 and of a remote control module 8 acting on an electrical control 7 of the circuit breaker. A circuit breaker of this type is, for example, marketed by the Applicant under the trademark COMPACT NS, with a TM type thermomagnetic trip device. Wire to wire cabling of the auxiliary contacts and of the indication module is performed by the switchboard fitter.

In all these circuit breakers, communication with the bus requires the use of indication and/or remote control modules external to the circuit breaker and a specific cabling by the switchboard fitter according to the type of trip device used.

SUMMARY OF THE INVENTION

The object of the invention is to achieve a device able to be connected directly to a communication bus. In the case of a circuit breaker this connection must be independent of the type of trip device used.

This object is achieved by the fact that the communication module is electrically connected to the auxiliary contacts and arranged inside the device in one of said locations, said module constituting a communication interface between the auxiliary contacts and the bus.

The communication module being connected to the auxiliary contacts, this is applicable to any device, circuit breaker or contactor of standard type. In the case of a circuit breaker, the latter can be equipped either with a thermomagnetic trip device or with an electronic trip device. In addition, the use of the location of an auxiliary contact to contain the communication module enables communication by bus to be integrated into any interruption device without using external modules. The communication module being located inside a circuit breaker, the wiring between the auxiliary contacts and the module is performed in plant, which reduces to the maximum the wiring to be performed by the switchboard fitter when installing the device.

According to a development of the invention, the interruption device comprising opening and closing control relays of the device, the module is electrically connected to said relays so as to enable remote control of the device by means of the bus.

The communication module then enables both indication information to be supplied and remote control orders to be received by means of the communication bus.

According to a development of the invention, the communication module comprises a logic circuit associated to means for storing at least one parameter able to be modified by means of the bus, said logic circuit receiving from the auxiliary contacts information representative of the state of the interruption device and remote control orders from the bus and supplying control orders to the opening and closing relays according to the remote control orders, the state of the device and said parameters.

According to particular embodiments, one of said parameters can prevent closing of the device by remote control after opening of the device in response to an electrical fault or authorize automatic resetting of the device or authorize remote control of the device from a local control and indication module connected to the bus.

BRIEF DESCRIPTION OF THE DRAWINGS

Other advantages and features will become more clearly apparent from the following description of different embodiments given as non-restrictive examples only and represented in the accompanying drawings in which.

DETAILED DESCRIPTION OF THE PREFERRED EMBODIMENT

Figure 1:
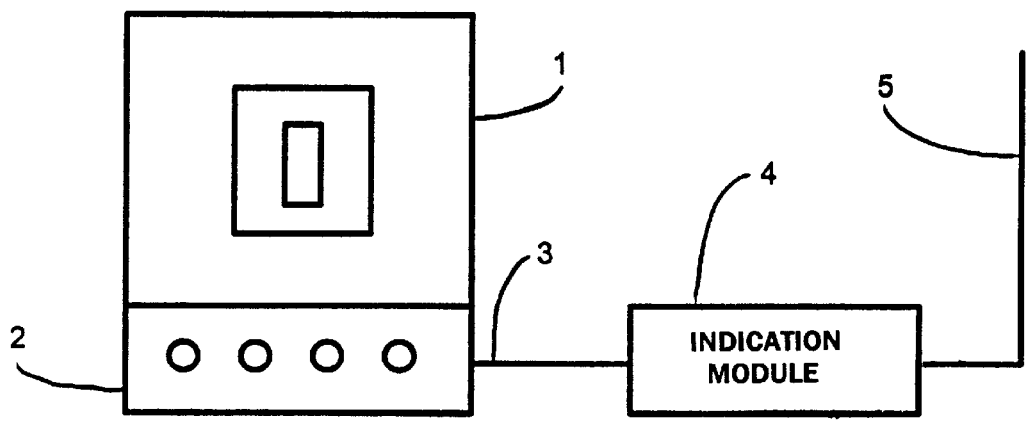
FIGS. 1 to 3 represent circuit breakers according to the prior art.
Figure 2:
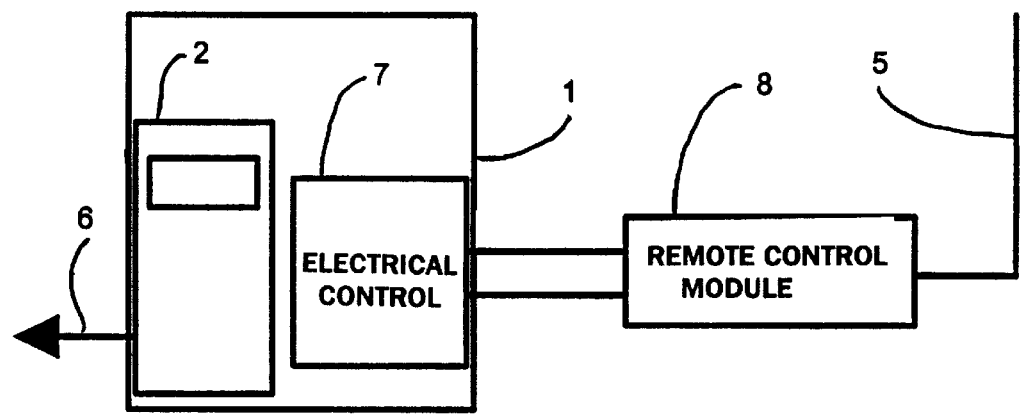
Figure 3:
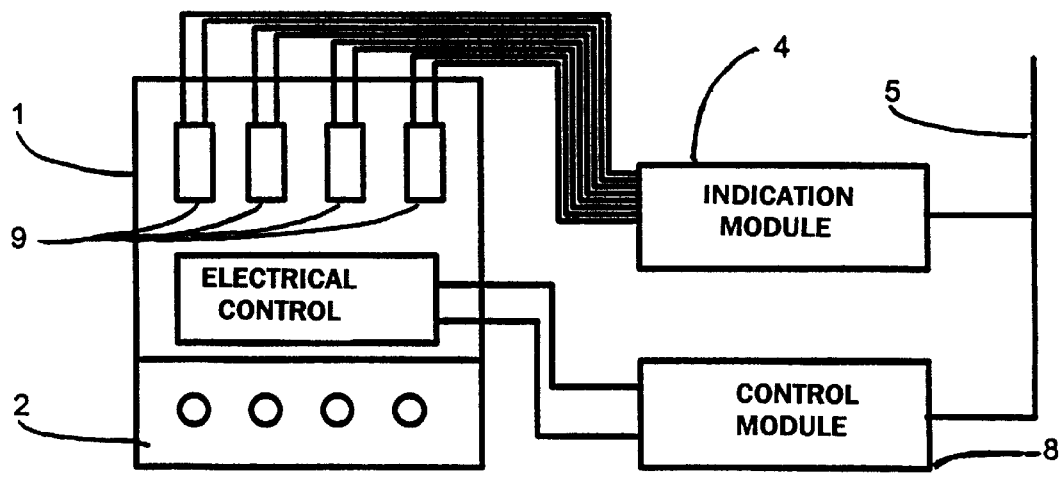
Figure 4:
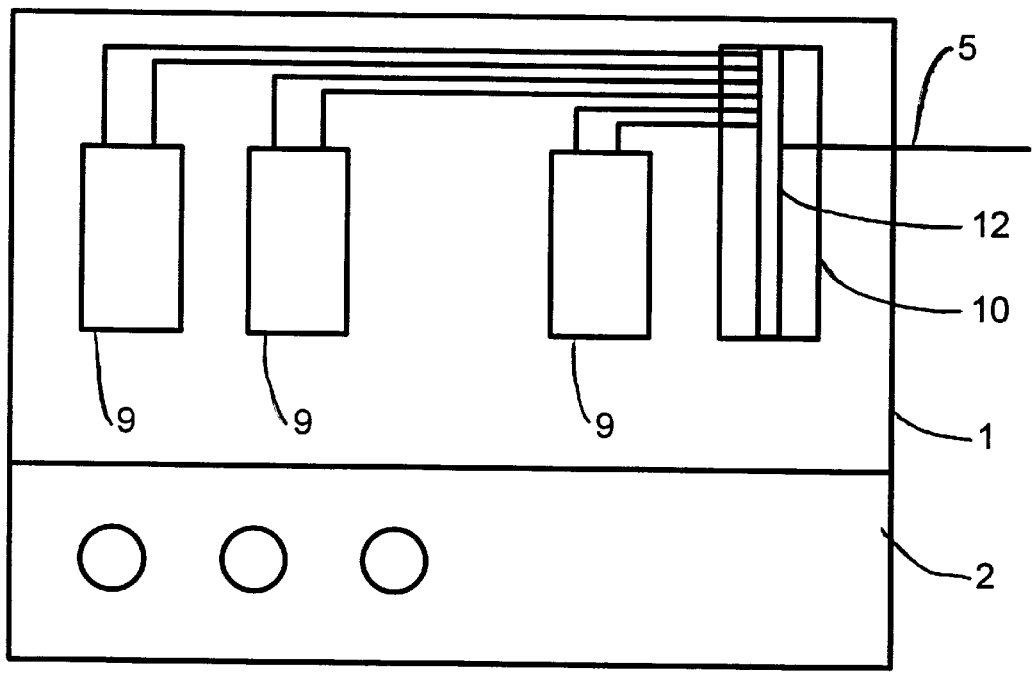
FIG. 4 illustrates the present invention in schematic form.
Figure 5:
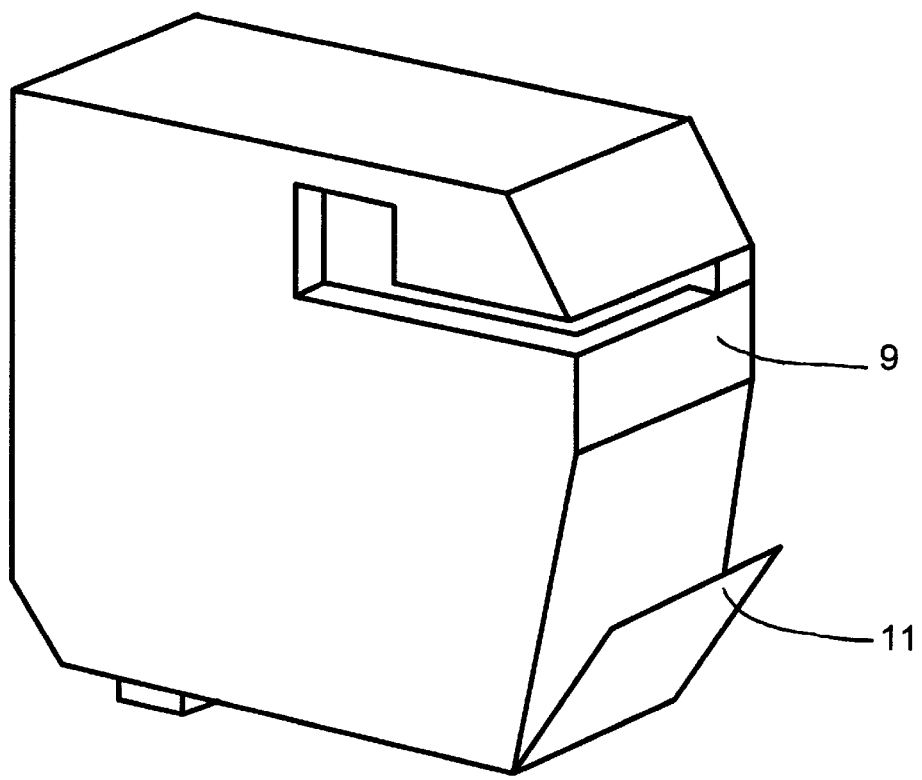
FIG. 5 represents a perspective view of an auxiliary contact.

In the particular embodiment of FIG. 4, the interruption device according to the invention is a circuit breaker 1, associated to a trip device 2, which may either be a thermomagnetic trip device or an electronic trip device. The circuit breaker 1 comprises three auxiliary contacts 9 which are, for example, of the type illustrated in FIG. 5, and comprises in addition a communication module 10. The latter is placed in a location normally provided for an additional auxiliary contact. The module 10 has a shape and dimensions such that it can be disposed without any difficulty in such a location. It preferably has the same appearance as an auxiliary contact 9 and thus constitutes a communicating auxiliary contact. In a preferred embodiment it has the same base and the same clipping device 11 as an auxiliary contact (FIG. 5), but may be higher (FIG. 4).

As represented schematically in FIG. 4, the module 10 comprises a processing board electrically connected on the one hand to the communication bus 5 and on the other hand at least to the auxiliary contacts 9. The embodiment of FIG. 4 constitutes the basic model, which enables the states of the apparatus (O/F, SD, SDE) to be indicated by means of the bus 5. All the wiring between the auxiliary contacts 9 and the module 10 is internal to the apparatus and the cabling to be performed by a switchboard fitter is reduced to the minimum.

Figure 6:
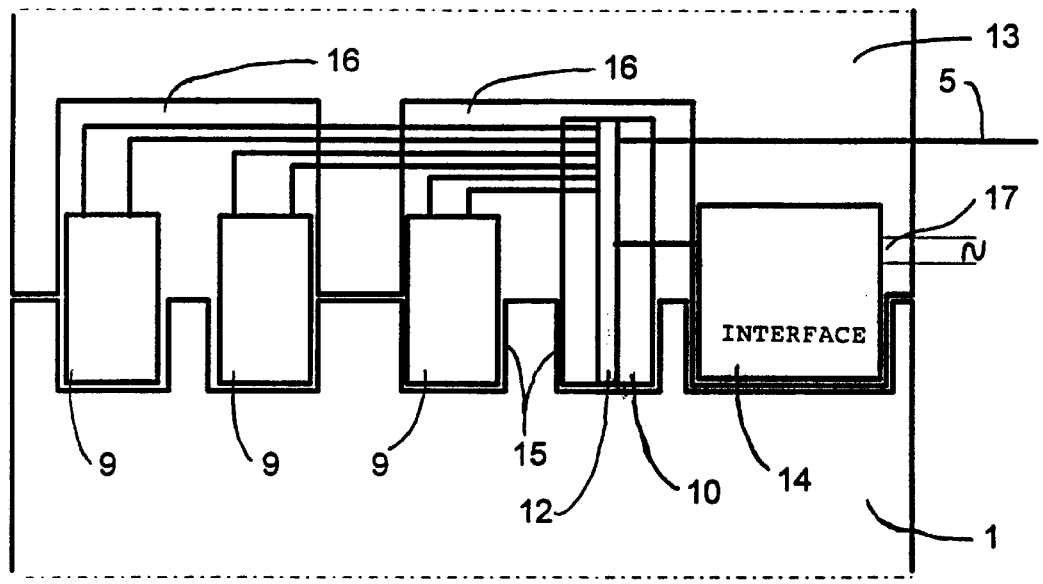
FIG. 6 illustrates the arrangement of a communication module inside a circuit breaker, FIG. 7 schematically represents a communication module according to the invention and its various electrical connections.

FIG. 6 illustrates in slightly greater detail the arrangement of a module 10 inside a circuit breaker. In the particular embodiment of FIG. 6, the module 10 enables both indication and remote control by means of the bus 5. FIG. 6 is a top view, in cross section, of the front panel of a circuit breaker 1 equipped with a remote control unit 13. Only a connection interface 14 indispensable for understanding has been represented in the remote control unit 13, which is of known type. The auxiliary contacts 9 and module 10 are each arranged in a location 15 provided for an auxiliary contact. Conventionally, the remote control unit 13 comprises recesses 16 arranged, when it is assembled on the circuit breaker 1, facing the locations 15 of the auxiliary contacts for ease of connection. This makes it possible to replace one of the auxiliary contacts by the communication module 10 without difficulty, even if the latter is a little higher than the conventional auxiliary contacts.

As in FIG. 4, the processing board 12 of the module 10 is electrically connected to each of the auxiliary contacts 9 and to the bus 5. In addition, it is electrically connected to a connection interface 14 of the remote control unit. The interface 14 generally has a power input 17 designed for power supply (220V AC for example) of the opening and/or closing relays of the circuit breaker to which it is connected by means of the remote control unit.

Figure 7:
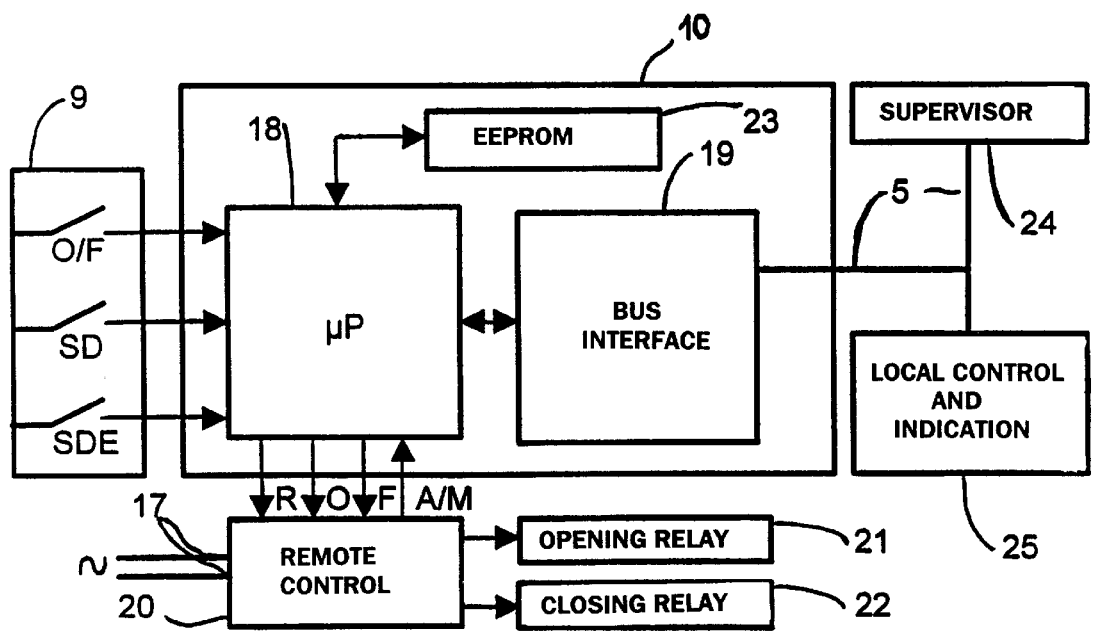

The wiring diagram of the module 10 according to FIG. 6 is represented in greater detail in FIG. 7. The module 10 comprises on the processing board 12 a logic circuit preferably formed by a microprocessor 18 connected by an interface 19 or bus 5. The interface 19 may be achieved in software form and be integrated in the micro-processor 18. The microprocessor is also connected to the auxiliary contacts, three of which O/F, SD, SDE) are represented in FIG. 7. It can thus transmit the states of these contacts to the bus 5. The microprocessor 18 is also connected to the remote control circuit 20 of an opening relay 21 and of a closing relay 22 of the circuit breaker. In the embodiment represented, four wires connect the microprocessor to the remote control circuit. These wires are respectively designed for transmission of an opening order (O), a closing order (F) or a reset order (R) of the module 10 to the remote control or for reading by the module 10 of the position of a contact (A/M), located on the front panel of the remote control unit and defining automatic or manual operating mode of the remote control.

The module 10 also comprises a memory 23, preferably of the EEPROM type, associated to the microprocessor 18. This memory is notably designed to store the address of the module 10 and the operating mode of the remote control. In a preferred embodiment, a remote addressing process is performed automatically by a supervisor 24 by means of the bus 5, when the module 10 is powered up. If no address is stored in the EEPROM 23, or if the latter has to be modified, the supervisor attributes an address to the module 10.

It is sometimes desirable to complete the above device by a local control and indication module 25. This module is designed to be arranged on the front face of a switchboard in which the circuit breaker 1 is located. It is connected directly to the bus 5, at the same address as the communication module 10. The parameters of the module 10 may be set by the supervisor 24 to operate either in distant mode only, in which it can only be controlled by the supervisor, or in a local mode in which control of the circuit breaker by the local module 25 is also authorized. In a preferred embodiment local mode is authorized by default, but can be locked by the supervisor which sets the parameter of the module 10 appropriately, the corresponding parameter being stored in the EEPROM 23.

In the embodiment of FIGS. 6 and 7, in which the module 10 performs both indication and remote control functions, the module can correlate these two types of functions. As an example, if after an opening or closing order has been sent the following indication state does not correspond to the order given, the module can send to the bus 5 alarm signals representative of a failure of the remote control. Moreover, the parameters of the module can be set by the supervisor so as to prevent or authorize resetting after tripping on an electrical fault, indicated by the auxiliary contact SDE. The module parameters can also be set to enable, or not, remote resetting, or automatic resetting, in the event of tripping indicated by the auxiliary contact SD.

In a preferred embodiment, the module 10 continuously performs reading of the state of the auxiliary contacts which are connected thereto and compares them with their previous state. If this state has been modified, and also in case of a request from the supervisor, the module transmits this information to the supervisor via the bus 5.

What is claimed is:

1. An electrical interruption device comprising a plurality of locations for auxiliary contacts whose state is representative of the state of the device, at least one auxiliary contact located in one of said locations and a communication module designed to be connected to a communication bus, a device wherein the communication module is electrically connected to the auxiliary contacts and arranged inside the device in one of said locations, said module constituting a communication interface between the auxiliary contacts and the bus.

2. The device according to claim 1, comprising opening and closing control relays of the device, wherein the module is electrically connected to said relays so as to enable remote control of the device by means of the bus.

3. The device according to claim 2, wherein the communication module comprises a logic circuit associated to means for storing at least one parameter able to be modified by means of the bus, said logic circuit receiving from the auxiliary contacts information representative of the state of the interruption device and remote control orders from the bus and supplying control orders to the opening and closing relays according to the remote control orders, the state of the device and said parameters.

4. The device according to claim 3, wherein the logic circuit supplies an alarm if the state of the device does not correspond to the control orders.

5. The device according to claim 3, wherein one of said parameters prevents closing of the device by remote control after opening of the device in response to an electrical fault.

6. The device according to claim 3, wherein one of said parameters authorizes automatic resetting of the device.

7. The device according to claim 3, wherein one of said parameters authorizes remote control of the device from a local control and indication module connected to the bus.

* * * * *